United States Patent [19]
Bouteille

[11] Patent Number: 6,102,074
[45] Date of Patent: Aug. 15, 2000

[54] MODULAR PNEUMATIC DISTRIBUTION ASSEMBLY

[75] Inventor: Daniel Bouteille, Viroflay, France

[73] Assignee: Parker Hannifin Rak S.A., Annemasse Cedax, France

[21] Appl. No.: 09/311,066

[22] Filed: May 13, 1999

[30] Foreign Application Priority Data

May 19, 1998 [FR] France .................................. 98 06300

[51] Int. Cl.$^7$ ...................................................... F15C 5/00
[52] U.S. Cl. ........................................... 137/884; 137/271
[58] Field of Search .................... 137/269, 271, 137/884

[56] References Cited

U.S. PATENT DOCUMENTS

| | | |
|---|---|---|
| 2,976,886 | 3/1961 | Miscovich . |
| 3,513,876 | 5/1970 | Tarbox .................................... 137/884 |
| 3,877,483 | 4/1975 | Nakajima . |
| 4,136,853 | 1/1979 | Johansson et al. . |
| 4,224,957 | 9/1980 | Darves et al. ........................... 137/270 |

FOREIGN PATENT DOCUMENTS 426 409   6/1997   Switzerland .

*Primary Examiner*—John Fox
*Attorney, Agent, or Firm*—Nixon Peabody LLP; Stuart J. Friedman

[57] ABSTRACT

A modular pneumatic distribution assembly comprising a plurality of modules, each formed by a pneumatic distributor fixed on a base which comprises at least one common length of pressure duct and at least one common length of exhaust duct, and means for fixing to an adjacent base, the assembly being remarkable in that each distributor is a distributor having a flat slide distributor communicating with the base via three distribution orifices and a pressure orifice, the axis of the slide mechanism being parallel to the direction of the common pressure and exhaust ducts in the bases, in that at least two distributors of the assembly are of different calibers, one having distribution orifices of a section that is at least twice the section of the distribution orifices of the other, and in that the outside profile of the section of each module on a plane perpendicular to the axis of the slide mechanism is identical regardless of the caliber of the distributor.

9 Claims, 3 Drawing Sheets

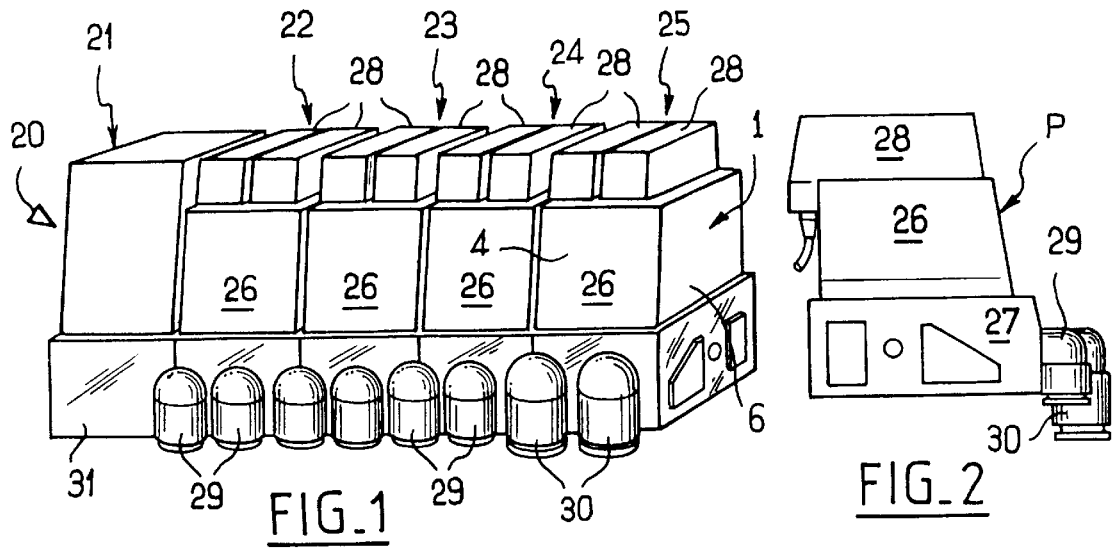
FIG_1
FIG_2
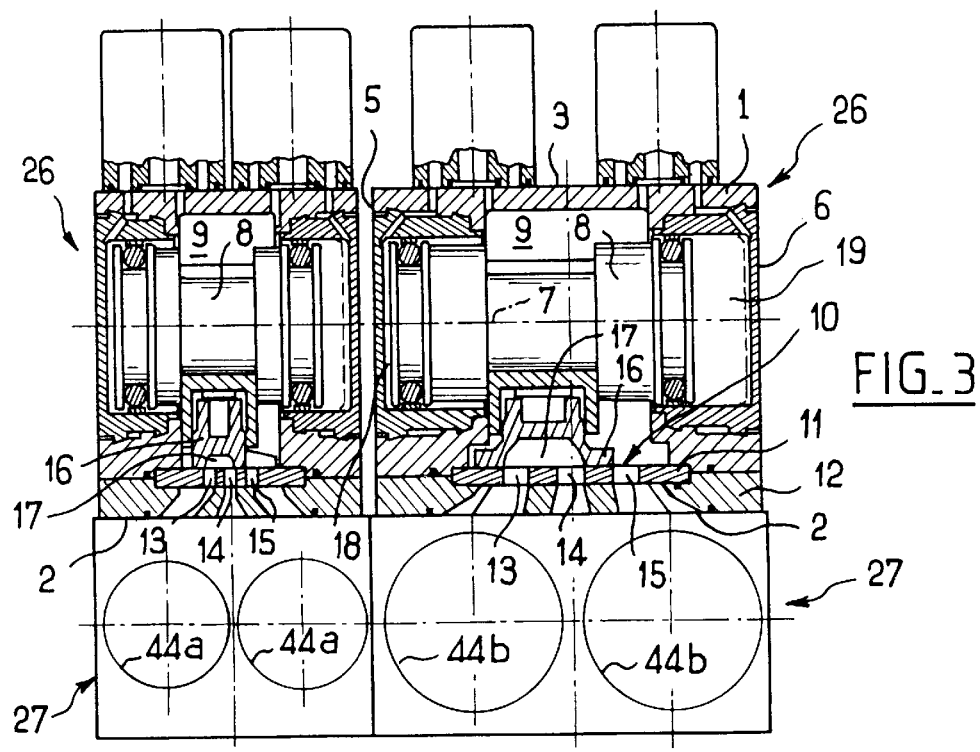
FIG_3
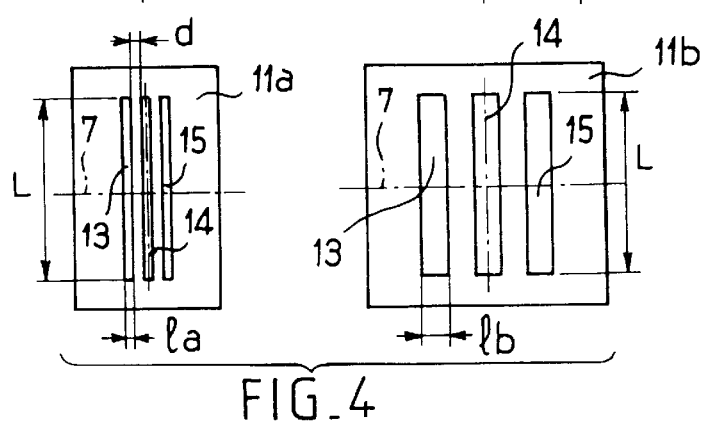
FIG_4

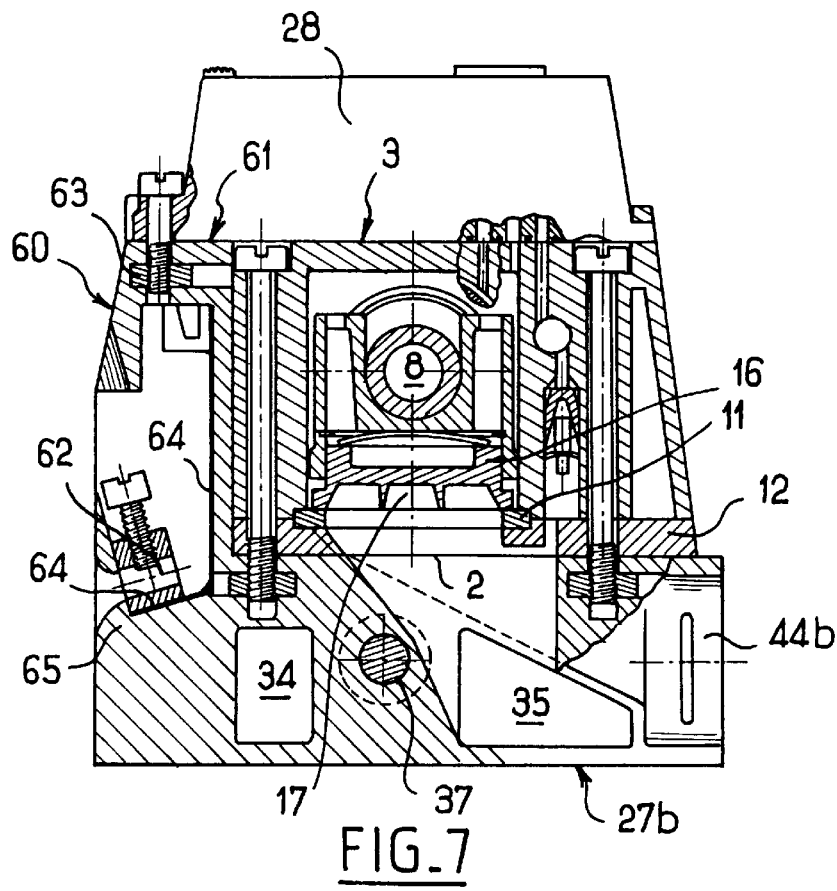
FIG_7
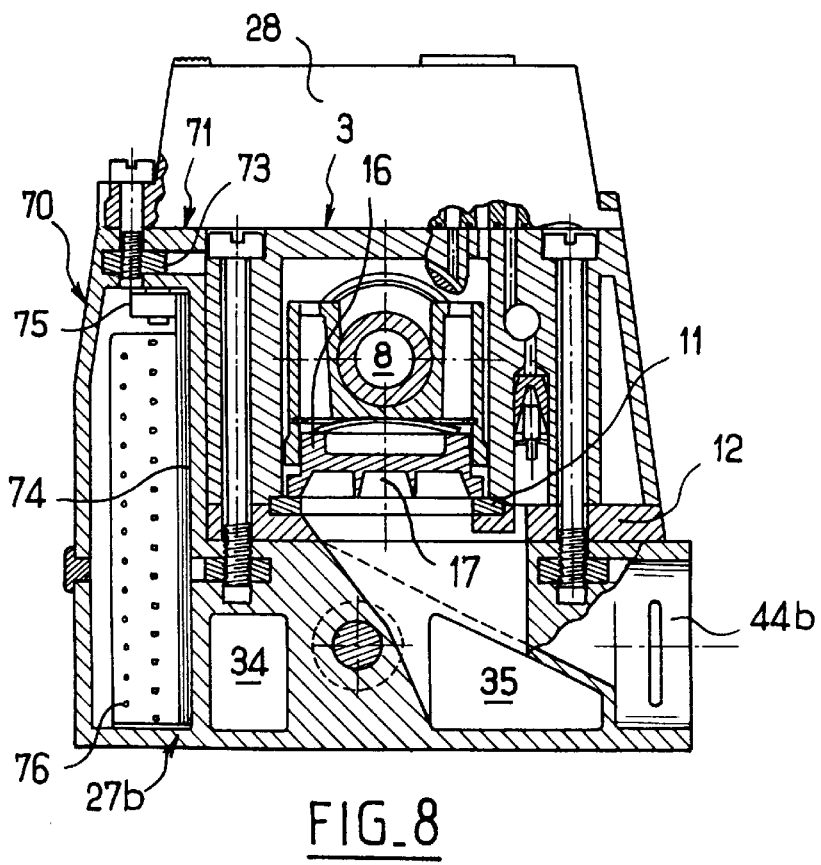
FIG_8

MODULAR PNEUMATIC DISTRIBUTION ASSEMBLY

The present invention relates to a modular pneumatic distribution assembly comprising a plurality of modules, each formed by a pneumatic distributor fixed to a base, the modules being united via their bases.

BACKGROUND OF THE INVENTION

In pneumatic and electropneumatic automation, associating distributors in functional blocks, each having a common pressure duct and one or two common exhaust ducts passing therethrough, has become a practice that is widespread, that significantly simplifies implementing distributors, and that leads to installations that are particularly well organized.

For each group of pneumatic actuators in an installation, a functional block is made up that comprises as many distributors as there are actuators to be controlled separately. This functional block is located close to the actuators and requires only one pressure feed and only one or two exhaust returns. In addition, in the more recent versions, the functional block can also receive all of its electrical power supply and commands via a single cable having multiple conductors connected via pluggable sockets.

In practice, the pneumatic actuators disposed in a single installation are of various sizes and they can have very different requirements for compressed air. In principle, each actuator should be associated with a distributor of caliber corresponding to its own size and air flow needs. This is what is generally done, and it is this optimization of caliber that restricts the extent to which a functional block can be made uniform. In a group of pneumatic actuators that are to be associated with a single functional block, the actuators are generally varied, and until now manufacturers have been offering only associations of distributors that are identical in caliber, thereby requiring the distributors for the smaller actuators in the group to be expensively overdimensioned.

OBJECTS AND SUMMARY OF THE INVENTION

An object of the present invention is to propose solutions for solving this problem, i.e. to make it possible to associate distributors of different calibers in a single functional block.

The invention stems from the observation whereby nearly all compressed air flow needs in automated pneumatic installations can be satisfied by flow sections lying in the range 12 mm$^2$ to 50 mm$^2$, and for the vast majority in the range 12 mm$^2$ to 38 mm$^2$, which corresponds to link tubes between distributors and actuators having an inside diameter lying in the range 2 mm to 7 mm or possibly 8 mm. On the basis of this observation, it has been decided to satisfy all such requirements by making only a small number of distributor calibers available, e.g. two distributor calibers: a first caliber having an internal pneumatic fluid flow section of 12 mm$^2$, and a second caliber presenting an internal pneumatic fluid flow section of 36 mm$^2$. The first caliber can satisfy the pneumatic fluid demands of actuators having diameters lying in the range about 6 mm to 35 mm. It can receive link tubes of an inside diameter lying in the range 2 mm to 4 mm and an outside diameter lying in the range 4 mm to 6 mm. The second caliber is intended to satisfy the compressed air requirements of actuators having diameters lying in the range 35 mm to 120 mm. The link tubes have an inside diameter of 6 mm or 7 mm and an outside diameter of 8 mm or 10 mm.

Naturally, these numerical values are given purely by way of example and constitute a compromise seeking to satisfy in optimum manner the largest possible number of requirements with the smallest amount of equipment, however it must be understood that on the same lines, when the first caliber is not less than 12 mm$^2$, the second caliber can be selected as being 50 mm$^2$ (inside diameter of the tube is 8 mm). It is also possible to select three calibers having respective flow sections of 12 mm$^2$, 30 mm$^2$, and 48 mm$^2$, for example.

Thus, on these lines, by selecting a particular switching technique, the present invention makes it possible to build up a pneumatic distribution assembly that is modular, i.e. it is possible to take distribution modules of different calibers and to assemble them together directly so as to build up a single distribution facility that it is neat in appearance.

To this end, the invention thus provides a modular pneumatic distribution assembly comprising a plurality of modules, each formed by a pneumatic distributor fixed on a base which comprises at least one common length of pressure duct and at least one common length of exhaust duct, and means for fixing to an adjacent base, the assembly being remarkable in that each distributor is a distributor having a flat slide distributor communicating with the base via three distribution orifices and a pressure orifice, the axis of the slide mechanism being parallel to the direction of the common pressure and exhaust ducts in the bases, in that at least two distributors of the assembly are of different calibers, one having distribution orifices of a section that is at least twice the section of the distribution orifices of the other, and in that the outside profile of the section of each module on a plane perpendicular to the axis of the slide mechanism is identical regardless of the caliber of the distributor.

This identical cross-section for each module regardless of its caliber is the means that enables an assembly to be built up by associating the bases of the respective modules directly with one another. To achieve this identity of section it is necessary firstly for the switching technique to be based on flat slide distributors, a technique that has been discarded of late in favor of cylindrical slide distributors, and secondly for the majority of compressed air flow requirements in a pneumatic installation to be satisfied by means of a small number of calibers comprising at least two calibers, with the section of the larger caliber providing a flow section that is at least twice that of the smaller caliber.

In a preferred embodiment of the invention, the internal flow section of the smaller caliber distributor is 12 mm$^2$. This section corresponds to use that is extremely widespread in the field of pneumatic automatic equipment having tubes with an inside diameter of 4 mm (outside diameter 6 mm), and to the equivalent size in the United States where the outside diameter is equal to ¼".

According to the invention, the distribution orifices of each distributor are in the form of elongate slots of long dimension orthogonal to the axis of the slide mechanism that is identical for the distributors of different calibers, the width of the slots of at least one distributor of the assembly being at least twice the width of the slots of the smallest caliber distributor.

It will be understood that when it is desired to go from one of these calibers to another, a large change in section of the distribution orifices is obtained by acting solely on the width thereof, so that a large increase in section is obtained by a very small increase in stroke. As a result, the only difference between two distributors of different calibers lies in the size thereof measured parallel to the axis of their slide distributors, whereas in conventional distribution modules suitable for being associated with one another, the change in caliber gives rise to a change of size in all three dimensions, thereby making it impossible to associate modules of different calibers without providing adaptors between them, thereby spoiling their appearance and further increasing the overall size of a modular assembly incorporating them.

In likewise preferred manner, the ratio between the two dimensions of a distribution orifice of the distributor of small caliber in the invention lies in the range 1:15 to 1:20, and the space between two adjacent orifices is not less than the smallest dimension of said orifices.

These values have been found after much trial and error and they are optimal in that the difference in the stroke of the slide distributor for two calibers with flow sections in a ratio of at least 1:2, is in absolute value as small as possible, such that regardless of the caliber, the contact qualities of the shoe on the wall provided with the distribution orifices remains entirely adequate. This makes it possible to minimize the differences in size between two distributors of different calibers, and thus to obtain a modular assembly that is extremely compact.

BRIEF DESCRIPTION OF THE DRAWINGS

Other characteristics and advantages of the invention appear from the description given below of various embodiments.

Reference is made to the accompanying drawings, in which:

FIG. 1 is a diagrammatic outside view of an example of a modular assembly of the invention;

FIG. 2 is a common cross-section through the assembly;

FIG. 3 is a longitudinal section through two modules of different calibers that are juxtaposed within a modular assembly;

FIG. 4 is a plan view of the distribution wall of the distributors of different calibers used in the modules of FIG. 3;

FIGS. 6, 7, and 8 are diagrammatic cross-sections through various bases which can be used to implement three types of modular assembly of the invention, said bases being shown fitted with their distributors and with the electrically-controlled valves for piloting them.

MORE DETAILED DESCRIPTION

Figure 5:
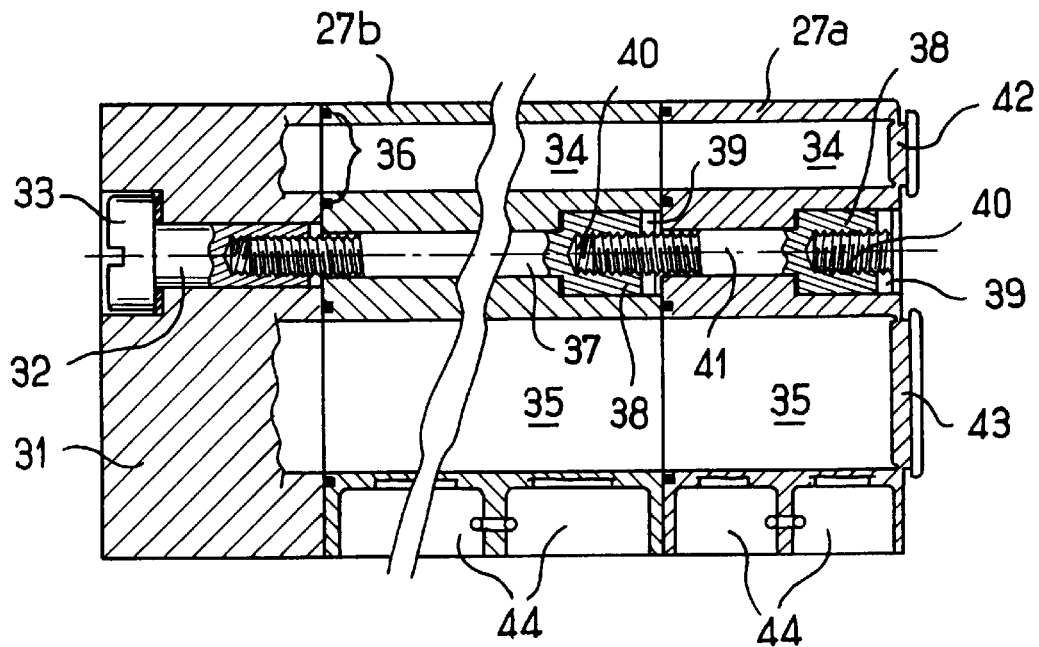
FIG. 5 is a diagrammatic section showing how the bases are associated with one another.

To begin with, the structure of a flat slide distributor is described. Such a distributor has a body 1 whose outside shape is generally in the form of a rectangular parallelepiped and which is defined by a bottom face 2 for association with a base, a top face 3 on which electrically-controlled pilot valves can be mounted, a front face 4, and two end faces 5 and 6 (FIGS. 1 and 3). The body 1 is provided with an internal hollow which includes cylindrical bearing surfaces for guiding a shaft 7 substantially perpendicularly to the end faces 5 and 6 and in which there is mounted a slide mechanism 8. Between the two bearing surfaces for guiding the slide mechanism, the internal hollow of the body 1 forms a chamber 9 which is defined by a side wall having a portion that presents a plane surface 10 directed towards the inside of the chamber 9. In conventional manner, this surface 10 is carried by a distribution plate 11 inserted in the body 1 between the main portion thereof and a distribution support plate 12, the distribution plate 11 is smooth and substantially parallel to the face 2 via which the distributor is associated with its base.

The smooth distribution plate 11 has three orifices 13, 14, and 15, and a shoe 16 is associated with the slide mechanism 8 and can slide over the surface 10 of the smooth plate 11. The shoe 16 has an internal hollow 17, and depending on the extreme positions taken by the slide mechanism along its axis 7, the shoe serves to establish communication for example in a first position between distribution orifices 13 and 14, with said communication being isolated from the chamber 9, and to uncover the last orifice 15 so that it is permanently subjected to the pressure that exists in the chamber 9. An orifice that is not shown in the figures provides permanent communication between the chamber 9 and a source of pressure, e.g. via a common feed duct for feeding fluid under pressure to all of the distributors of a given modular assembly and which is housed in the base. In a second position of the slide mechanism, the hollow 17 establishes communication between the orifices 14 and 15, which communication is isolated from the chamber 9, while the orifice 13 is in communication with the chamber 9. It will be understood that with the chamber 9 connected to a source of pressure, and with the middle orifice 14 connected to an exhaust channel, when the slide mechanism is in the first position, the orifice 13 communicates with the exhaust and the portion of the pneumatic circuit leading to the orifice 13, in particular via the base, is put into communication with the exhaust, while the portion of the pneumatic circuit leading to the orifice 15 is put under pressure. In the other position (not shown) of the shoe, it is the orifice 15 and thus the portion of the pneumatic circuit that terminates therein which is connected to the exhaust while the other portion of the pneumatic circuit terminating at the orifice 13 communicates with the source of pressure.

In the example shown in FIG. 3, changes in the position of the slide mechanism 8 are obtained by selectively connecting pilot chambers 18 and 19 to the source of pressure or to the exhaust, which pilot chambers are formed in the body 1 at the ends of the slide mechanism 8. Connection of each of these chambers to the feed or to the exhaust is controlled by electrically-controlled pilot valves.

In FIG. 3, the flat slide distributors that are shown are bistable. Naturally, the invention also applies to flat slide distributors that have only one pilot chamber co-operating with one end only of the slide mechanism 8, while the other end thereof is subjected to a return spring continuously urging the slide mechanism 8 into a given position. That would constitute a monostable distributor. With bistable distributors, two electrically-controlled valves are required to pilot the slide mechanism, whereas with a monostable distributor, a single electrically-controlled valve suffices. It will be observed in FIG. 3 that the base 27 associated with the small caliber distributor has outlet orifices 44*a* that are smaller in diameter than the corresponding outlet orifices 44*b* from the base associated with the larger caliber distributor.

The modular assembly 20 of FIG. 1 has five associated modules, namely an inlet module 21, three small caliber modules 22, 23, and 24, and one larger caliber module 25. Apart from the inlet module 20, each of the modules 22 to 25 has a flat slide distributor 26, a base 27, and two electrically-controlled valves 28 for bistable distributors, or else one electrically-controlled valve and an empty cover (also referenced 28 in FIG. 2) for monostable distributors.

In its base, each of the small caliber modules has two small diameter outlets symbolized by angle couplings 29. The larger caliber module 25 has two larger diameter outlets symbolized by angle couplings 30. It can be seen in FIG. 1, and in FIG. 2 which is a cross-section through the modular assembly away from the inlet module, that the only difference that exists between a small caliber module 22, 23, or 24, and a larger caliber module 25 lies in the dimension of the module measured in the association direction, and in the size of the couplings associated therewith.

FIG. 2 shows this single difference clearly, given that the profile P of each module, whether of small caliber or large caliber, is strictly identical.

The figures show the advantage of the measures of the invention that enable modules of different calibers to be constructed while modifying only one of the three dimensions of said modules. A first advantage lies merely in terms of appearance, but the advantages are above all of practical and functional nature since they enable the bases of a modular assembly to guarantee correspondence between common pressure and exhaust ducts, and where appropriate for electrical conductors also, merely by juxtaposing and associating said bases by means that are very simple, e.g. means of the screw kind.

The reason why it is possible to have modules of different calibers with transverse profiles that are identical, thereby enabling them to be associated in a single uniform modular assembly, lies in an improvement of the structural dispositions of flat slide distributors.

One of these structural dispositions is associated with the smooth plate 11 used for distribution. FIG. 4 shows a plan view of two different distribution plates, 11a on the left of the figure for a small caliber distributor and 11b on the right for a larger caliber distributor. It will be observed in this figure that the orifices 13, 14, and 15 provided in these plates are in the form of elongate slots of long dimension L extending orthogonally to the axis 7 of the slide mechanism 8. This long dimension is identical regardless of the caliber of the distributor. Since the section of the orifices 13, 14, and 15 determines the caliber of the distributor, it will be understood that by changing the section of these orifices, the caliber of the distributor is changed correspondingly, and all that needs to be done is to vary the width of the orifices 13, 14, and 15 so as to modify the flow sections thereof. In FIG. 4, the width $1_a$ of the orifices in the plate 11a is one-third the width $1_b$ of the orifices in the plate 11b. By way of numerical example, $1_a$ is equal to 0.8 mm, $1_b$ is equal to 2.4 mm, the inter-orifice spacing $\underline{d}$ is 0.9 mm wide for the small caliber distributor, and is 2.4 mm wide for the large caliber distributor, while the length L is 15 mm. The internal flow sections are thus respectively 12 mm$^2$ and 36 mm$^2$.

It is for the purpose of minimizing the influence of orifice width on the overall dimensions of the distributor that the long dimension of the orifices extends perpendicularly to the stroke direction. After much trial and error, it has found that an optimum solution in terms of overall distributor size is obtained by selecting a ratio of width to length for the orifices of the smallest caliber distributor in the range 1:15 to 1:20, with the width of the inter-orifice space $\underline{d}$ for said distributor being substantially equal to or greater than the width of the orifices $1_a$.

This solution is also optimum for the orifices 44a and 44b (FIG. 3) in which the couplings are received for the tubes that link a base to an actuator. Specifically, and particularly for the preferred embodiment of the invention that has two calibers, the size of the large-caliber base along the axis 7 is about 50% greater than the same size for the small-caliber base, thereby making it possible in harmonious manner to provide orifices for receiving couplings for tubes having an inside diameter of 7 mm in the longer base and orifices for couplings for tubes having an inside diameter of 4 mm in the shorter base.

It can be seen from the above that the different flow sections for the two different calibers has no influence, for example, on the size of the shoe as measured in the long direction of the orifices, or on the diameter of the slide mechanism, or on the spacing between the slide mechanism and the smooth plate, . . . , and that all of the dimensional differences due to different calibers extend in a single direction only, i.e. along the axis of the slide mechanism. By causing the slide mechanism axis to extend along the direction in which the modules are assembled together to make a single assembly, it is possible to have base elements of cross-section that is uniform for the various calibers, with the only dimension that varies extending in the assembly direction of the modular assembly.

FIG. 5 is a sectional diagram through the bases on a horizontal plane parallel to the direction of the distributor slide mechanisms, taken through a modular assembly comprising an inlet module and modules of different calibers. In this figure, the base circuit 1 of the inlet module which contains inlet and outlet means for the common pressure and exhaust ducts, plus also where appropriate for electrical conductors, is not shown in detail. It should merely be observed that this base is provided with a nut 32 in the form of a tubular sleeve that is tapped at one of its ends and that has a head 33 for receiving a screwdriver at its other end. The base 27b corresponding to a large-caliber module naturally has a length 34 of common pressure feed duct passing therethrough for feeding pressure to each of the distributors, and a length 35 of common exhaust return duct for taking exhaust from the distributors. This base 27b is associated with the base of the inlet module 31 by plane-against-plane contact with sealing gaskets 36, and by means of a screw 37 having a head 38 embedded in an appropriate housing provided in the base, the screw 37 being in alignment with the nut 32 of the base 31 so as to be engaged therein. This head has a screwdriver-receiving slot 39 and tapping 40 for receiving the assembly screw 41 of the following base 27a, e.g. a base corresponding to a module of small caliber.

This base 27a is also provided with common duct segments 34 and 35 and with a screw 41 that is identical to the screw 37, ignoring its different length.

It would have been observed that the base 27a constitutes the end base of the modular assembly of the invention and thus retains shutter members 42 and 43 which close the common pneumatic ducts. These shutter members 42 and 43 are removable, and if the base 27a had been inserted between two modules within a modular assembly, then prior to being assembled therein, its shutter members 42 and 43 would have been removed by cutting through their attachments to the body of the base, as has been done for the base 27a. Thus, every modular base of the invention has shutter members 42 and 43 prior to being used for the first time, which shutter members are situated on its face that includes a housing for the head of the assembly screw. The base 42 is also delivered with its shutter members and its screw mounted, e.g. in non-losable manner, in the bore that receives it.

Figure 6:
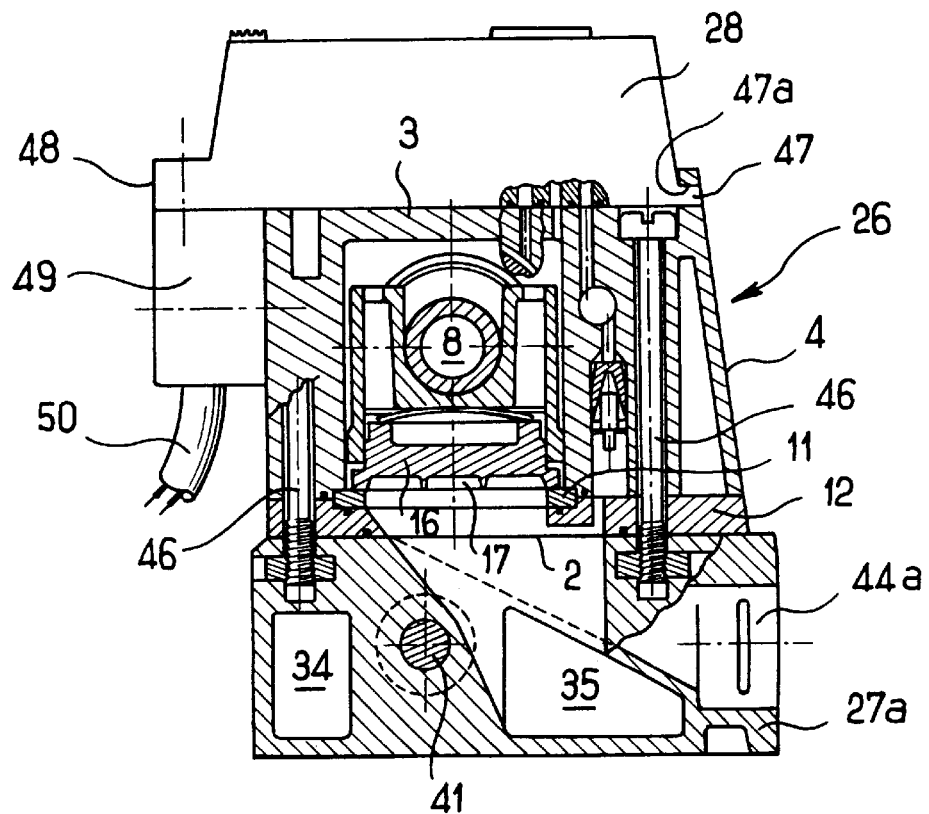

FIG. 6 is a section perpendicular to the axis of the slide, through a small caliber module in which the sole function of the base 27a is to provide the common pneumatic passages 34 and 35 for the entire modular assembly and to provide internal ducts between its face for association with the module and the outlet orifices 44a so as to connect each module to the actuator it is to control. This base is no more than a simple rectangular parallelepiped providing a surface against which the face 2 of a distributor 26 is placed and is secured thereto by means of two screws 45 and 46 with the soleplate 12, the smooth plate 11, and the body 1 of the distributor being sandwiched therebetween. On its top face 3, the distributor carries one or two electrically-controlled valves 28 for piloting purposes.

At one of its ends, the electrically-controlled valve 28 has a tab 47 which is received in an orifice 47a provided at the top of the distributor close to its front wall 4, while the other end 48 of the electrically-controlled valve 28 projects beyond the distributor to receive fixing means 49 for fixing it to the distributor and from which connection wires 50 extend.

In the other two embodiments shown in FIGS. 7 and 8, the base of the invention associated with a distributor and with electrically-controlled valves relates to a large-caliber module. The differences that can be seen between these large-caliber modules and the small-caliber module of FIG. 6 lie in the diameters of the orifices 44 for receiving the small angle couplings 29 or the larger-diameter couplings 30, and in the volume of the hollow 17 of the shoe 16 of the flat slide distributor. In FIGS. 7 and 8, it can be seen that the bridging vault constituted by the shoe over the slots in the smooth plate 11 is deeper than in the shoe shown in FIG. 6.

In both of these embodiments, the base has a bottom portion 27b of section that is entirely similar to the base 27a described above (with the exception of the diameter of its outlet orifices 44b), and a back piece 60, 70 which rises perpendicularly to the surface on which the distributor is placed and parallel to the axis of its slide mechanism along the back face of the distributor so as to present a top surface 61, 71 level with the top surface 3 of the distributor. This top surface thus extends the plane on which the electrically-controlled valve 28 is placed. This electrically-controlled valve can be secured to the base via said surface by means of a screw 51 co-operating with a captive nut 63, 73.

In FIG. 7, the back piece 60 is fitted with electrical conductors 64 which co-operate with the pins of the electrically-controlled valve 28, said conductors 64 being pressed against a rim 65 of the back piece 60 which carries connection terminals 62 for the power supply wires of the electrically-controlled valve 28.

In FIG. 8, the back piece 70 constitutes a lateral channel on the back face of the module in which a printed circuit 74 can be received, together with a connector 75 for receiving the bottom pins of the electrically-controlled valve 28 and a multi-pin connector 76 for making an electrical connection to each of the successive modules.

The above description relates to a preferred embodiment of the invention in which the internal flow section of the smallest caliber distributor is 12 mm$^2$ and in which there are only two different calibers for making up a range.

Other embodiments of the invention are possible. It is nevertheless advantageous for each of them to have a small-diameter distributor that is identical to that described above, i.e. having an internal flow section of 12 mm$^2$. That is the size which is used most often in a modular assembly, given the majority of flow rate requirements in an automated pneumatic installation. By way of indication, it is mentioned that its length along the axis of its slide mechanism is about 22 mm. This module can then be associated with other modules of larger calibers, for example having internal sections of 30 mm$^2$ and 48 mm$^2$, or even more. These modules are necessarily larger in the assembly direction (the axial direction of the slide mechanism) than is the smallest caliber module. A specific value can be provided for this dimension in each of the two or three additional modules, thus requiring each component to be specially designed. However, since the frequency with which such modules occur in assemblies is low on the whole (less than one-fourth the frequency with which the smallest-caliber module appears), the size of this dimension is of small influence on the length of a set of modules. Thus, for all modules other than the smallest module, in these other embodiments, the dimension concerned can be identical and equal to the dimension required for the largest caliber module. This makes it possible for the modules additional to the small module to benefit from manufacture that is highly standardized. All of the components of the distributor can be identical to those designed for the largest caliber with the exception of the smooth plate provided with the distribution orifices that vary from one module to another, and do so solely in the width and in the relative positions of the slots forming said orifices. Another variation from one module to another lies in the diameters of the orifices for housing the couplings. In this respect, it should be observed that the largest caliber module will determine the thickness of the base (its dimension perpendicular to the plane on which the distributor is placed) and thus also the thickness of the base of the smallest-caliber module.

What is claimed is:

1. A modular pneumatic distribution assembly comprising a plurality of modules, each formed by a pneumatic distributor fixed on a base which comprises at least one common length of pressure duct and at least one common length of exhaust duct, and means for fixing to an adjacent base, wherein each distributor is a distributor having a flat slide distributor communicating with the base via three distribution orifices and a pressure orifice, the axis of the slide mechanism being parallel to the direction of the common pressure and exhaust ducts in the bases, wherein at least two distributors of the assembly are of different calibers, one having distribution orifices of a section that is at least twice the section of the distribution orifices of the other, and wherein the outside profile of the section of each module on a plane perpendicular to the axis of the slide mechanism is identical regardless of the caliber of the distributor.

2. A modular assembly according to claim 1, wherein the distribution orifices of each distributor situated facing the base are in the form of elongate slots of long dimension orthogonal to the axis of the slide mechanism that is identical for the distributors of different calibers, the width of the slots of at least one distributor of the assembly being at least twice the width of the slots of the smallest-caliber distributor.

3. A modular assembly according to claim 2, wherein, in the smallest-caliber distributor the ratio of the two dimensions of a distribution orifice lies in the range 1:15 to 1:20, and wherein the width of the inter-orifice space is substantially equal to or greater than the width of a distribution orifice.

4. A modular assembly according to claim 3, wherein the section of a distribution orifice of the smallest caliber distributor is 12 mm$^2$.

5. A modular assembly according to claim 3, wherein the bases are interconnected by means of a screw having a tapped head passing through the bases parallel to the common duct segments thereof.

6. A modular assembly according to claim 5, wherein the common duct segments in each base are provided at their tapped screw head ends with shutter means that can be removed therefrom by being sectioned.

7. A modular assembly according to claim 5, wherein each base has a soleplate in the form of a rectangular parallelepiped and a back piece extending perpendicularly to the surface on which the corresponding distributor is placed and parallel to the axis of the slide mechanism thereof.

8. A modular assembly according to claim 7, wherein the top surface of the back piece is level with the top surface of the distributor, the back piece being fitted with a nut for receiving a fixing screw at one end of an electrically-controlled pilot valve placed on the distributor at its end remote from the base and having the other end of the electrically-controlled valve secured to the distributor by means of a tab slid into a housing in the body of said distributor.

9. A modular assembly according to claim 7, wherein the back piece forms a support for electrical connector means for making connections between the various modules that are associated together and between the electrically-controlled valves and the modules.

* * * * *